(No Model.) 6 Sheets—Sheet 1.
E. B. COXE.
ELEVATOR APPARATUS.
No. 441,288. Patented Nov. 25, 1890.
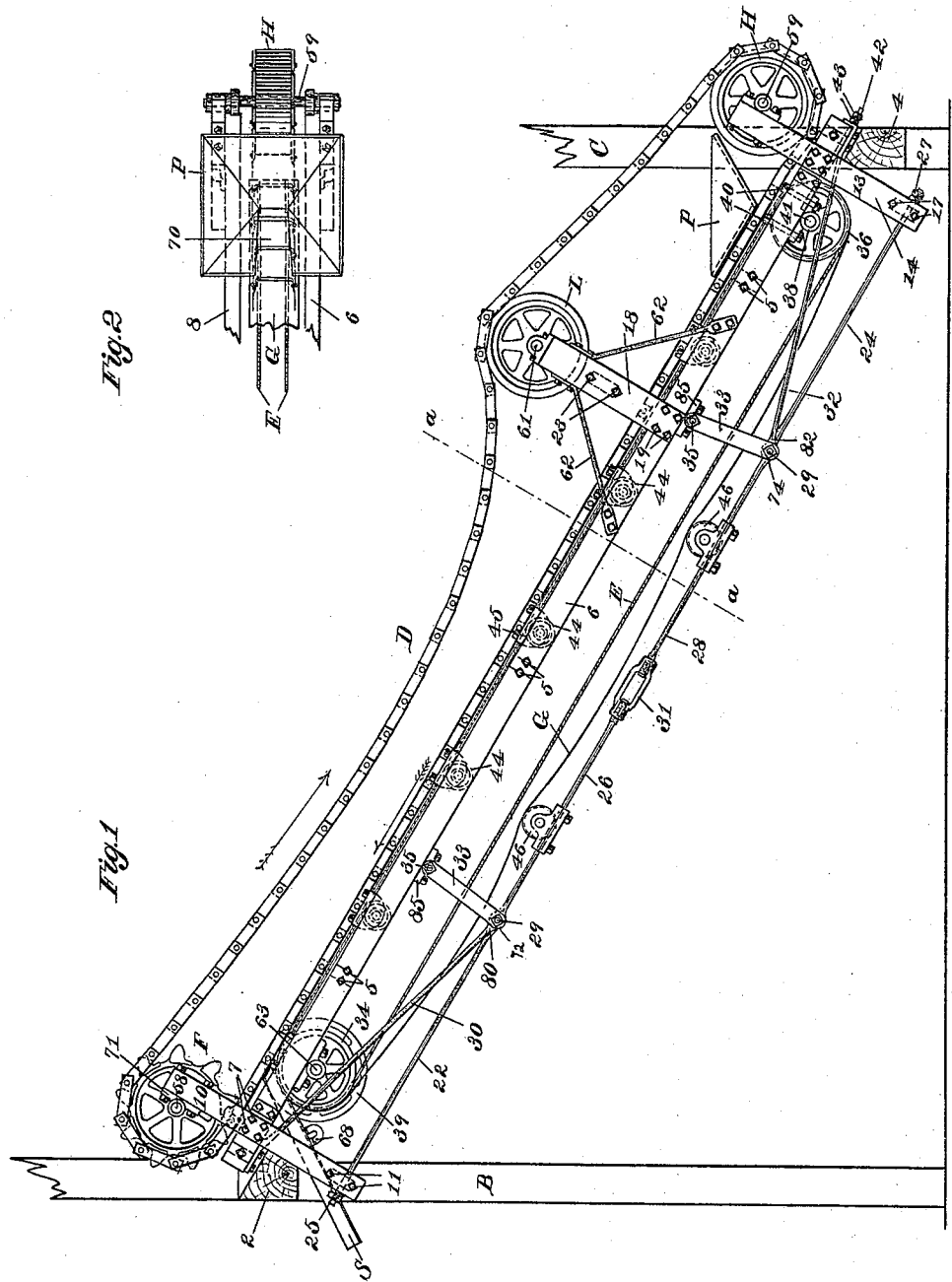

(No Model.) 6 Sheets—Sheet 2.
E. B. COXE.
ELEVATOR APPARATUS.
No. 441,288. Patented Nov. 25, 1890.
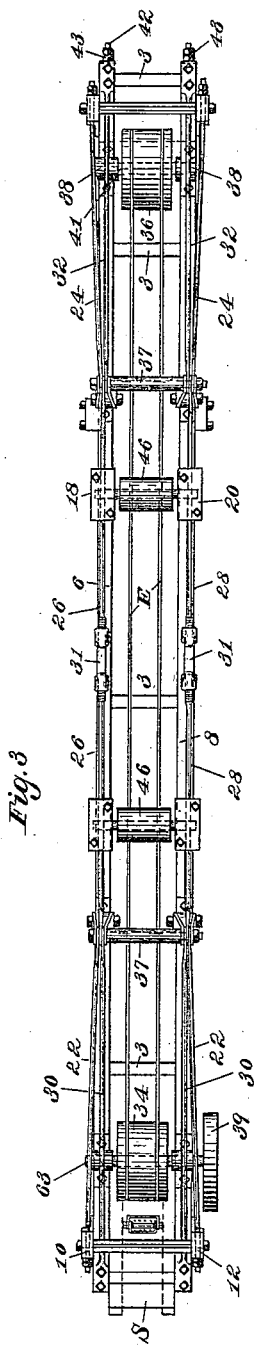
Witnesses:
Henry L. Reckard.
Wm R Bjorkman.
Inventor:
Eckley B. Coxe,
By his Attorney F. H. Richards (No Model.) 6 Sheets—Sheet 3.
E. B. COXE.
ELEVATOR APPARATUS.
No. 441,288. Patented Nov. 25, 1890.
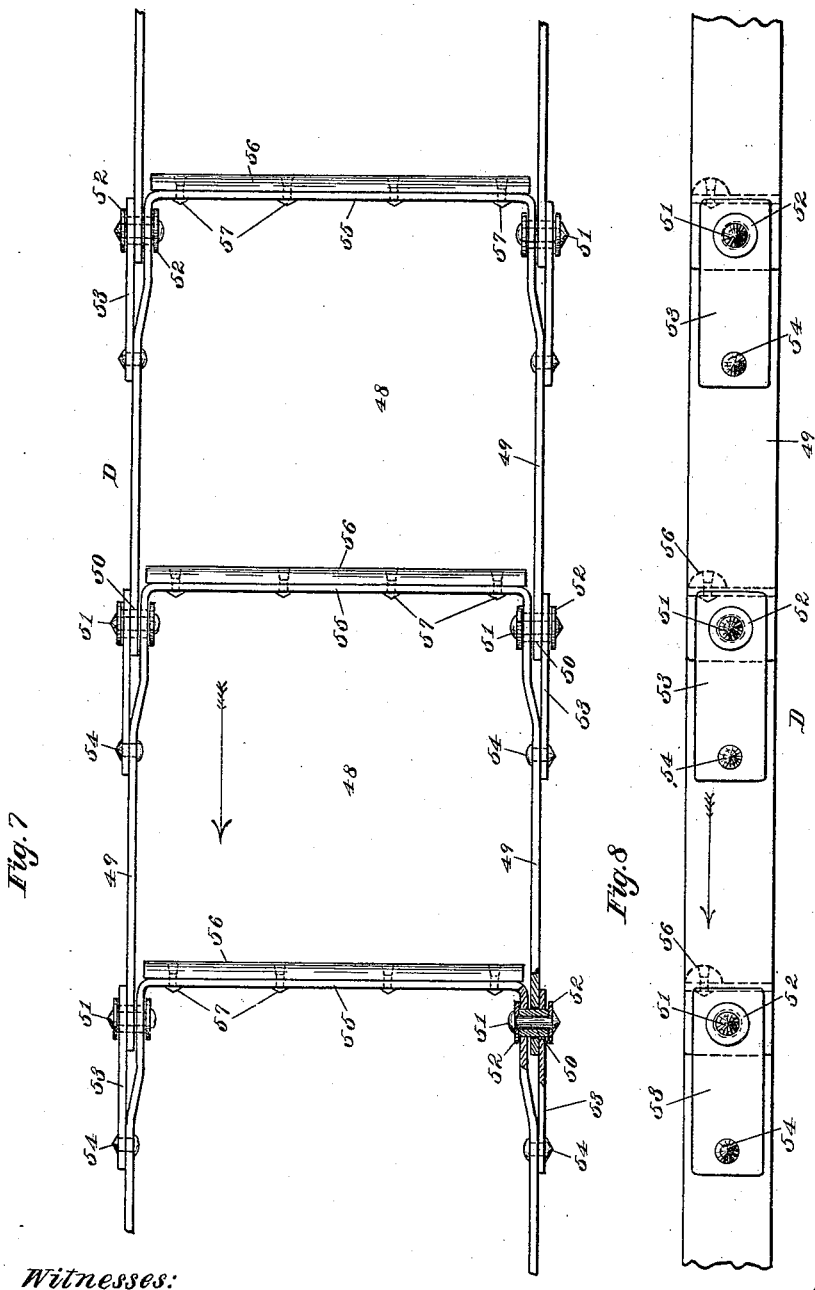
Witnesses:
Henry L. Rickard.
W. M. Bjorkman.
Inventor:
Eckley B. Coxe,
By his Attorney F. A. Richards (No Model.)  6 Sheets—Sheet 4.
E. B. COXE.
ELEVATOR APPARATUS.
No. 441,288.  Patented Nov. 25, 1890.
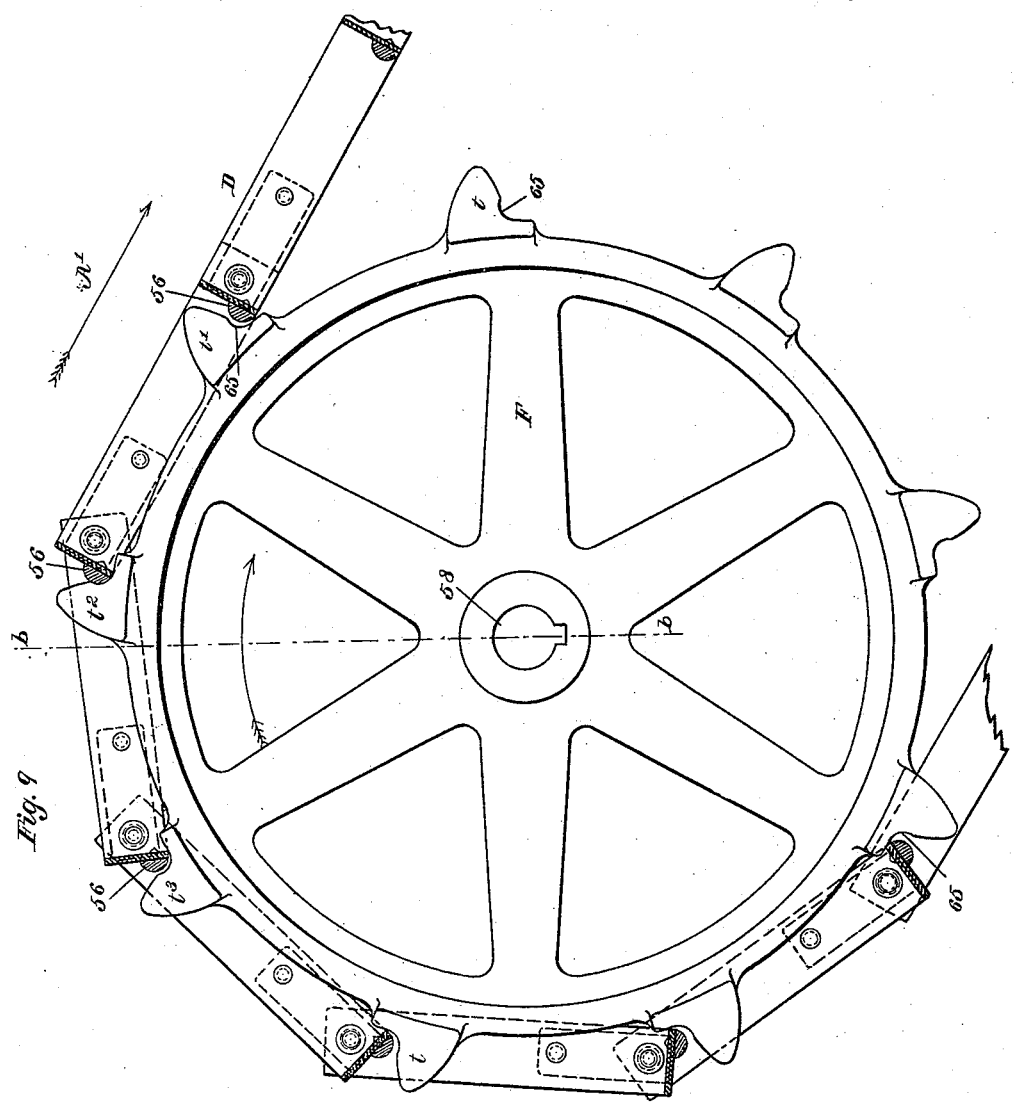
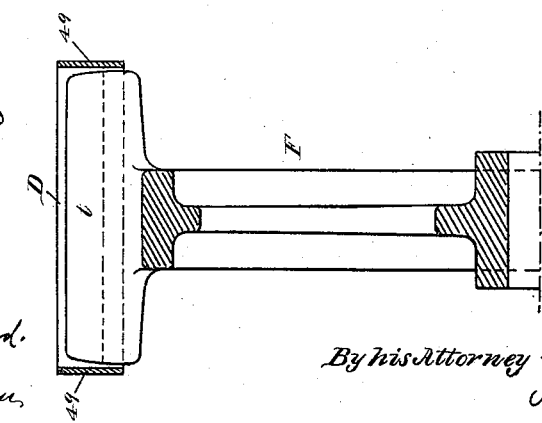
Witnesses:
Henry L. Reckard.
W. M. Bjorkman
Inventor:
Eckley B. Coxe,
By his Attorney F. A. Richards (No Model.)
E. B. COXE.
ELEVATOR APPARATUS.
No. 441,288.
6 Sheets—Sheet 5.
Patented Nov. 25, 1890.
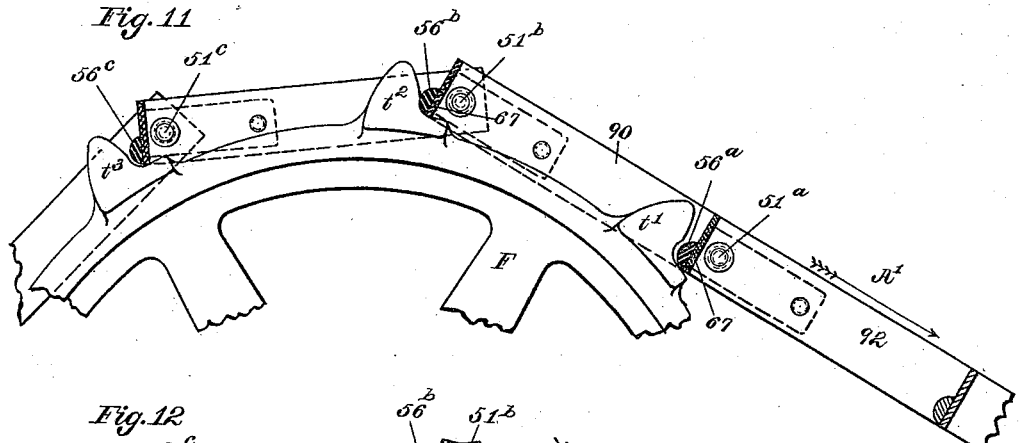
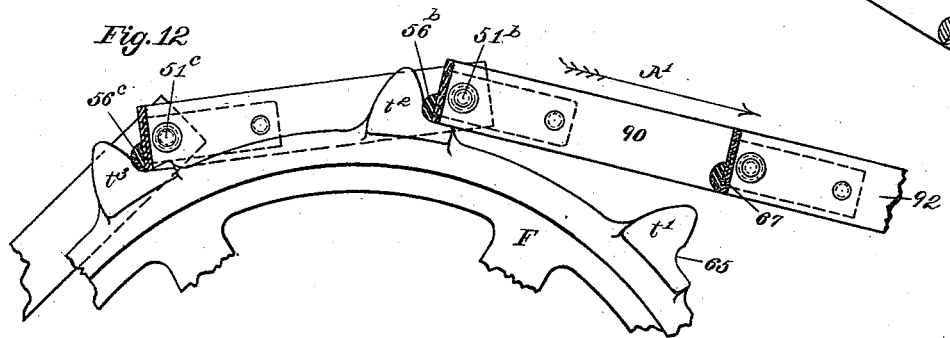
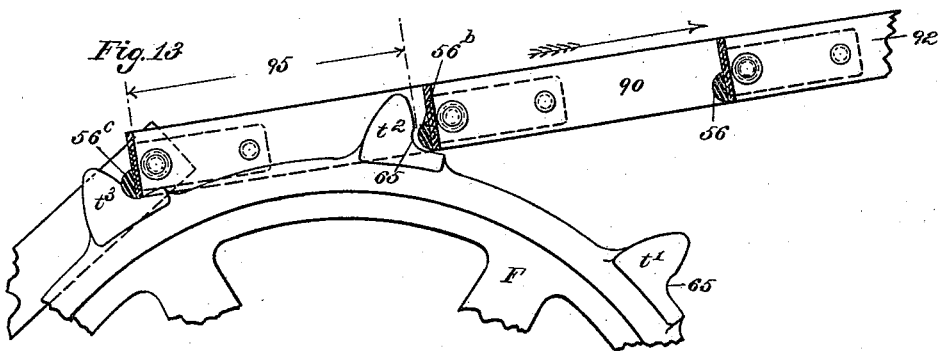
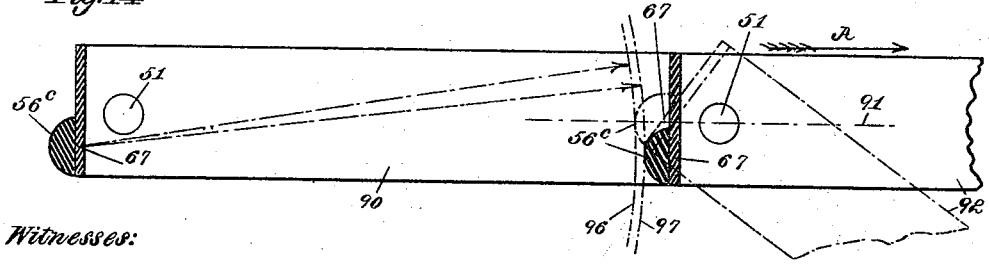
Witnesses:
Henry L. Rickard.
Wm. Bjorkman.
Inventor:
Eckley B. Coxe,
By his Attorney
F. H. Richards (No Model.) 6 Sheets—Sheet 6.

E. B. COXE.
ELEVATOR APPARATUS.

No. 441,288. Patented Nov. 25, 1890.

Witnesses:
Henry L. Rickard.
Wm. Bjorkman.

Inventor:
Eckley B. Coxe,
By his Attorney, F. H. Richards

UNITED STATES PATENT OFFICE.

ECKLEY B. COXE, OF DRIFTON, PENNSYLVANIA.

ELEVATOR APPARATUS.

SPECIFICATION forming part of Letters Patent No. 441,288, dated November 25, 1890.

Application filed June 7, 1890. Serial No. 354,542. (No model.)

*To all whom it may concern:*

Be it known that I, ECKLEY B. COXE, a citizen of the United States, residing at Drifton, in the county of Luzerne and State of Pennsylvania, have invented certain new and useful Improvements in Elevator Apparatus, of which the following is a specification.

This invention relates to elevators for coal, grain, and like materials, the object being to provide an elevator having an endless conveyer belt or apron furnished to elevate and convey the material up steep inclines.

Figure 15:
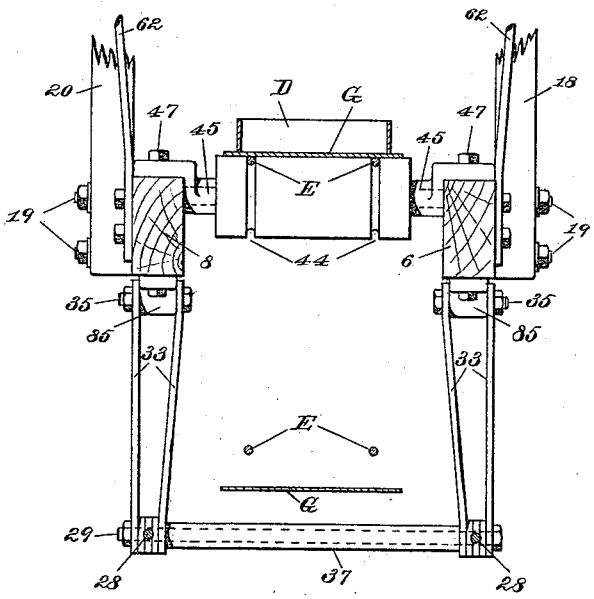
Figure 16:
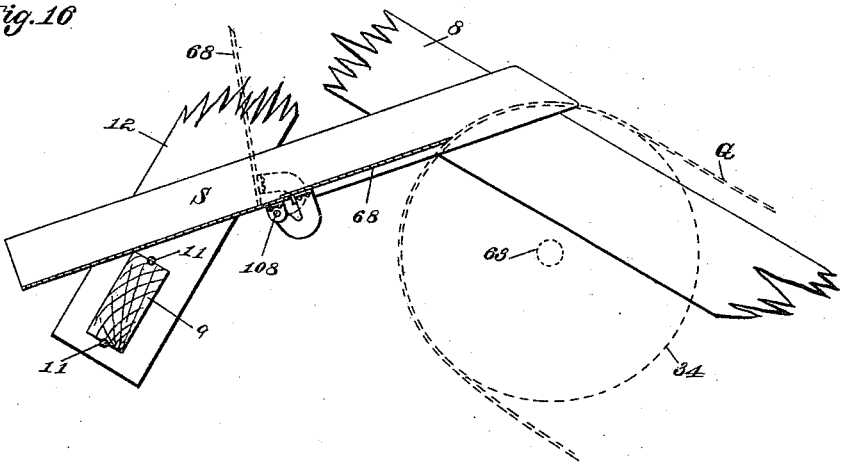

In the drawings accompanying and forming a part of this specification, Figure 1 is a side elevation of a coal-elevator embodying my improvements. Fig. 2 is a plan view of the lower end thereof, showing the supply-hopper P in position. Fig. 3 is a plan view of the under side of the machine with some parts omitted or removed. Fig. 4 is a view of the machine as seen from the upper end, which is at the left hand in Figs. 1 and 3, the chain-wheel being shown in section. Fig. 5 is a section on the line $a\ a$ of Fig. 1, some parts being omitted or removed. Fig. 6 is a view of the lower end of the machine, which is at the right hand in Figs. 1 and 3, the driven chain-wheel being shown in section. Figs. 7 and 8 are enlarged plan and side elevations of a portion of the conveyer-chain, showing in detail the form and construction thereof. Fig. 9 is an enlarged side elevation of the chain-wheel, with a part of the conveyer-chain thereon, and shown in section. Fig. 10 is a sectional view of a portion of the chain-wheel and the chain, this view being taken on the line $b\ b$, Fig. 9. Figs. 11, 12, 13, and 14 are views illustrating the method of actuating the conveyer-chain by means of the driving chain-wheel. Fig. 15 is a vertical section of a portion of the machine, this view being taken on line $a\ a$ of Fig. 1, and drawn to a larger scale. Fig. 16 is a sectional view of the discharge-chute and some accessory parts drawn on a scale corresponding to the scale of Fig. 15.

Similar characters designate like parts in all the figures.

The letters B C designate suitable posts, which may also be part of the frame of a building, for supporting the beams 2 and 4, which carry the elevator.

The elevator frame-work consists of the parallel beams or stringers 6 and 8, held at the proper distance apart by cross-pieces 3, mortised into the said beams in the usual manner, and by the bolts 5, as shown in Figs. 1 and 3. Near the upper or left-hand end of the stringers 6 and 8 are secured, at right angles thereto, the posts 10 and 12, by means of the bolts 7. Said posts are braced near their lower ends by means of a cross-bar 9, bolted thereto by bolts 11. Near the lower ends of the said beams 6 and 8 another and similar pair of posts 14 and 16 are similarly secured to the stringers by the bolts 13, and are braced near their lower ends by means of a cross-bar 15 and by the bolts 17. (See Figs. 1, 4, and 6.) An intermediate pair of pulley-supporting posts 18 and 20 are secured to the beams 6 and 8, respectively, by means of bolts 19, and are braced by a cross-bar 21, held in place by bolts 23, as shown in Figs. 1 and 3.

As a means for supporting posts 18 and 20 against displacement longitudinally of the machine, I provide braces or rods 62 62, bolted thereto in a well-known manner, substantially as shown.

For supporting the stringers under the weight of the conveyers and load and for holding the end posts in place against the tension of the conveyers, there is provided a system of truss-rods, substantially as follows: Two pairs of similar rods 22 22 and 24 24 pass through the lower ends of the posts 10 and 12 and 14 and 16, respectively, and are furnished with similar pairs of nuts 25 and 27, respectively. Said rods 22 24 have formed on their inner ends eyes or loops 72 74, respectively, through which pass the bolts or cross-rods 29 29, and two pairs of similarly-formed rods 26 26 and 28 28, at whose outer ends are formed eyes or loops, through which the said bolts 29 also pass, and whose inner and adjacent ends have right and left hand threads, respectively, engaging the turn-buckles 31. Two pairs of similarly-formed rods 30 30 and 32 32, also furnished at their inner ends with eyes 80 82 to receive the bolts 29, are secured at their outer ends by bolts to the upper and lower ends, respectively, of the beams 6 and 8. Four pairs of similarly-formed links or struts 33, bored at their lower ends to receive the said bolts 29, are pivoted at their upper ends at 35 to the beams 6 and 8 by means of any suitable bearing-blocks 85 in a well-known manner. The bolts 29 are furnished with the sleeves 37, which serve to hold the above-described parts in place. By means of the turnbuckles 31 the tension of the above-described truss-rods may be adjusted to keep the stringers from sagging and the whole system of rods in proper tension. The driving-drum 34 is carried by the driving-shaft 63, which is journaled in suitable bearings that are fixed to the under side of the beams 6 and 8 near the upper end thereof. The said shaft has also fixed thereto a driving-pulley 39, whereby power may be applied to drive the machine. Another drum 36, similar to drum 34, is carried by the shaft 41, which is journaled in suitable bearings 38, that are adjustably attached to the under side of the beams 6 and 8, near the lower end thereof, by means of the bolts 40, said bolts passing through slots formed in the said beams, so that when the nuts thereof are loosened the said bearings 38 may be adjusted by means of the threaded rods 42, that are furnished with the nuts 43 for that purpose. The driving-drum 34 and the driven drum 36 are grooved to receive a pair of endless rope belts E, which belts are supported intermediately between the said drums on rollers or drums 44 of small diameter, that are journaled in suitable bearings 45, secured by bolts 47 to the upper side of beams 6 and 8, as shown in Figs. 1 and 5. The endless conveyer-belt G, which I prefer to make of sheet-steel, is carried by the drums 34 and 36 outside of the aforesaid rope belts E, the upper side of said conveyer being supported directly on said rope belts. The belt G is preferably a slack belt, and may be supported at intervals along its under side by idler-rollers 46, which are journaled in suitable bearings, as 49, that are carried on the tension-rods 26 and 28. Said conveyer-belt is driven by the combined action of the driving-drum 34 and the said rope belts.

The construction of the endless conveyer-chain, which is designated in a general way by the letter D, is best shown in Figs. 7 and 8, and may be substantially as follows: The chain D consists of links or sections which inclose separate spaces or buckets 48, in which the material lies on the endless belt G. The ends of the chain-links, which form the side walls 49 of the said buckets, are bored to receive the thimbles 50, through which pass the rivets 51, that are provided with the washers 52. Re-enforcing links or straps 53, secured by rivets 54 to the side walls 49, are provided to give proper outer bearings for said thimbles. The rear thimbles of each bucket form the forward pivots for the next succeeding bucket or link of the chain. The middle part 55 of the chain-links form the rear walls of the buckets, and serve to carry forward the material as well as to furnish a means for driving the chain-wheels. Rounded bars 56 are secured by means of rivets 57 (or by screws, not shown) to the said rear walls contiguous to the upper edge thereof, for engaging the teeth of the chain-driving wheel F. Said wheel F is keyed or otherwise fixed to the shaft 58, which is journaled in some suitable bearings, as 71 71, that are or may be fixed to the posts 10 and 12, near the upper ends thereof, by bolts, substantially as shown in the drawings. A driving-pulley 60, Fig. 4, is also fixed to the shaft 58, whereby a belt may be applied for driving the chain. The chain D is supported at the lower end of the machine on the drum H, which is carried by a shaft 59, that is journaled in suitable bearings on the posts 14 and 16 of the frame-work. In practice, the chain D is necessarily made to run slack, as indicated in Fig. 1, it being supported, when of considerable length, on an idler-pulley L, which is carried on a shaft 61, that is journaled in bearings fixed on the posts 18 and 20. The pulleys H and L have rims 64 and 66, respectively, of a width to engage between the sides of the links of the bucket-chain, and thus guide the same.

The construction of the chain-wheel F and the manner in which it operates upon the chain D are more fully illustrated in Figs. 9 to 14, inclusive. The wheel F has formed thereon teeth, which are designated in a general way by $t$ and individually by $t'$ $t^2$, &c. Said teeth fit freely between the sides 49 of the links of chain D, and have formed in their working-surfaces the depressions 65, which form bearings for and engage the rounded bars 56 of the said chain. In practice, the distance between the working-surfaces of the successive bearing strips or bars 56 when the chain is straightened out is greater than the distance or chord measurement between the bearings 65 of successive teeth $t$ of the wheel. This feature of the construction is illustrated in Figs. 11, 12, 13, and 14, where the operation or coaction of the wheel F and the chain is shown by successive stages.

In Fig. 11 the links 90 and 92 are in alignment, (the chain being moving off from the wheel in the direction of the arrow A',) while the bearing $56^b$ rests firmly in its bearing in tooth $t^2$. At this time (owing to the construction of the chain whereby the axes 67 of said "bars 56" lie below the line 91, Fig. 14, of the chain-pivots 51) the bearing-bar $56^c$ stands forward of the tooth $t^3$, but owing to the aforesaid construction, when the link 90 is raised from the wheel, as in Fig. 12, the pivot $51^b$ is allowed to recede on the periphery of the wheel until the bearing-bar $56^c$ comes against the tooth $t^3$, as shown in Fig. 12. After this the further straightening out of the chain-links 90 and 92, as shown in Fig. 13, draws the bearing-bar $56^b$ away from and out of the bearing in tooth $t^2$, as in said Fig. 13, and throws all the resistance onto the succeeding tooth $t^3$, which now corresponds to the tooth $t^2$ in Fig. 11. This action of the chain is well shown diagrammatically in Fig. 14, where the link 92 is shown in two positions—in solid and dotted lines, respectively—the variation in the distance 95, Fig. 13, being shown by the distance between the arcs 96 and 97, which are drawn concentric to the axis 67 of the bearing-bar 56°. This distance 96 97 constitutes a clearance or allowance for obtaining a perfect action of the chain on the wheel notwithstanding the inaccuracy of construction unavoidable in this class of machinery.

In operating the machine power is applied to the driving-wheels in the direction to draw the upper side or run of the belt G and the lower side or run of the chain D up the incline at similar rates of movement. That portion of said chain which is passing upward rests on the endless conveyer-belt, which then forms the bottoms of numerous buckets, whose sides consist of the chain-links. The hopper P, with the exception of the discharge-opening therein, is of the ordinary kind used for feeding granular materials to elevators and machinery. Said hopper is shown in position in the machine (see Figs. 1 and 2) over and within the circuit of the elevator-chain, where it is to be supported by suitable supports (not shown) in a well-known manner. These supports may consist of ordinary braces attached to the frame-work or to the building in which the machine is set up. The hopper P is shown of the general form of an inverted pyramid, but obviously the particular form thereof may be modified to suit the circumstances. The discharge-opening of the hopper consists of a slot or space 70 in the side of the hopper which lies close to the chain, said opening 70 being a little narrower than the chain D and extending from a point at or near the lower side of the hopper to the upper edge thereof, as indicated in Fig. 2. The coal or other granular material to be elevated being placed in the hopper P naturally slides down the sides thereof onto the elevator-chain, which draws the same up the incline longitudinally of said discharge-opening 70, which opening, extending, as described, to the upper edge of the hopper, allows the material to be carried up without any clogging. The coal or other material to be elevated is first delivered into said hopper, and passes from thence through said opening into the chain-spaces, and rests on the belt or carrier G. The chain D, traveling at the same speed as the belt G, holds the said material on said belt during the ascent of the incline. Arriving at the top of the machine, the belt G passes down over the drum or wheel 34, while the chain continues directly on a short distance—not less than the length of one chain-bucket—and then passes upward over the driving-wheel F. This discharges the material forward of the upper end of the belt onto a platform or other place located to receive it. For this purpose I provide a chute S, which is to be supported in position substantially as shown in Figs. 1 and 16, for receiving the material and directing the same into bins or other receptacles therefor. The upper part 68 of the bottom plate of said chute is hinged at 108, so as to be swung back, as shown by dotted lines in Fig. 16. The upper edge of the said plate 68 is brought to an edge contiguous to the belt G for separating the coal or other material therefrom. Said belt being endless, and if made of separate pieces having the laps in the right direction, the edge of said plate may bear on and be supported by the belt, as shown in Fig. 16, thus completely clearing the belt of the material carried up thereon. It will be observed in Fig. 1 that the lower run of the bucket-chain D passes beyond the top of the chute S, and the upper end of the conveyer-belt a distance not less (and preferably somewhat greater) than the length of one of the chain-buckets, so that the vertical wall forming the lower side of the bucket is continued vertical to the upper run of the conveyer-belt until after it passes said belt, thereby properly discharging the bucket before the conveyer-chain begins to pass up over the upper pulley.

One purpose of the elevated chain-carrying wheel L is to hold up the conveyer-chain above the supply-hopper P, so as to provide sufficient room over said hopper for conveniently supplying the same. This will be evident from Fig. 1, where said wheel L is placed near the lower end of the machine. When the elevator apparatus is of great length, there may of course be two or more of said supporting-wheels located at convenient distances along the stringers.

It will be observed that the frame-work comprising the stringers, the posts, and the system of truss-rods, together with the machinery carried by said frame-work, constitutes a self-contained machine which may be assembled and transported as a whole, to be set up in the place where it is to be used, by means of any convenient supporting framing or timber-work. This feature of my improvements is advantageous in many situations, since it permits the machine to be moved from point to point along a wharf or storage-dock, and since it may readily be transported from place to place by means of ordinary vehicles.

Having thus described my invention, I claim—

1. In an elevator apparatus, the combination, with stringers having the upper and lower posts carrying the upper and lower chain-wheels respectively, and with the conveyer-belt drums carried by said stringers, of the conveyer-belt carried, substantially as described, on said drums, the conveyer-chain carried by said chain-wheels and arranged for its lower side to lie on and travel with said conveyer-belt, the supply-hopper discharging onto said chain and belt, the receiving-chute located to receive the materials from the upper end of the conveyer-belt, means for supporting the conveyer-chain over the supply-hopper, truss-rods and struts, substantially as described, supporting the stringers under their load, and truss-rods connecting the stringer-supporting struts with the lower ends of the chain-wheel-carrying posts for resisting deflection of said posts.

2. In elevator apparatus, the combination, with frame-work having belt-carrying drums, of the conveyer-belt carried on said drums and the conveyer-chain lying on the upwardly-moving side of the conveyer-belt, and together with said belt forming conveyer-buckets, said chain consisting of bucket-forming links, substantially as described.

3. In elevator apparatus, the combination, with the stringers and the drums 34 and 36, of the rope belts connecting said drums, the endless conveyer-belt carried by said drums and rope belts and running slack thereon, and idler-rollers underneath and supporting the lower side of said slack conveyer-belt.

4. In elevator apparatus, the combination, with the endless conveyer-belt arranged for its upper run to travel up the incline, of the endless conveyer-chain arranged for its lower run to travel up the incline while lying on said conveyer-belt, and a supply-hopper discharging onto the conveyer chain and belt, said supply-hopper being located, substantially as shown, within the circuit of said chain.

5. In elevator apparatus, the combination, with the endless conveyer-belt and with the conveyer-chain lying on said belt and moving therewith, of the supply-hopper set over the conveyer-chain and having in the side thereof contiguous to said chain a discharge-opening extending from a point at or near the bottom of said hopper to the upper side thereof, said opening being narrower than the chain, whereby the chain draws the material from the hopper longitudinally of the opening.

6. In elevator apparatus, the combination, with the endless conveyer-belt, and with the endless conveyer-chain arranged for its under run to travel up the incline with said belt, of the supply-hopper set over said chain and belt and under the return run of the chain, and the intermediate chain-supporting wheel located within the circuit of the chain and supporting the upper and return run of the chain above the supply-hopper.

7. In elevator apparatus, the combination, with the endless conveyer-belt constructed and arranged for its upper run to move up the incline and pass downward at the upper end of said incline, of the conveyer-belt consisting of a series of bucket-forming links, substantially as described, connected together and lying on said belt, and arranged to continue its movement beyond the upper end of the belt a distance not less than the length of one of said bucket-links, whereby the wall of the bucket is carried beyond the conveyer-belt before changing its position.

8. In elevator apparatus, the combination, with the endless conveyer-belt arranged to pass up the incline and pass down over a drum placed at the top of the incline, of the conveyer-chain consisting of a series of bucket-forming links, substantially as described, and arranged to travel upward on said belt and directly beyond said belt a distance not less than the length of one of said bucket-links, and a chute receiving the material from said conveyers and set contiguous to said drum, whereby the chain-bucket is emptied onto the chute beyond the belt before changing its position relatively to the upper run of the conveyer-belt.

9. In elevator apparatus, the combination, with the conveyer-chain D thereof, having bucket-forming links constructed substantially as described, and furnished with bearing-bars 56, of the driving chain-wheel F, having teeth $t$, each having a bearing 65 formed in the forward side and near the base thereof, the chord distance between said bearings being less than the distance between the axes of said bearing-bars when the chain is straightened out, and greater than the distance between the axes of said bars in that part of the chain which is in engagement with said wheel.

10. In elevator apparatus, the combination, with the conveyer-chain thereof, and with a chain-driving wheel, substantially as described, having bearings 65, of the conveyer-chain D, consisting of bucket-forming links provided with bearing-bars below the line of the chain-pivots, whereby the straightening out of the chain when leaving the wheel relieves one bearing-bar from its engagement with the wheel and brings the next succeeding bearing-bar into contact with the wheel.

11. In elevator apparatus, the combination, in the conveyer-chain thereof, of bucket-forming links, each comprising a middle part, as 55, forming a cross-bar, sides 49 49, perforated near each end thereof for pivots, the pivots, and the re-enforcing pieces 53, attached to said sides 49 and engaging the outer ends of said pivots.

12. In elevator apparatus, the combination, in the conveyer-chain thereof, of the bucket-forming chain-links, each having a middle part 55, the side parts 49 49, and re-enforcing straps 53 53, attached to said side parts, said side parts and straps being perforated for pivots, and the chain-pivots consisting of the washers 52, the thimble 50, and the rivet 51, firmly uniting said thimble and washers, there being a space between the sides 49 and said straps 53 for the end of another chain-link to engage said pivot-thimble.

13. In elevator apparatus, the combination, with the endless slack-running conveyer-belt and with the belt-carrying drums grooved to receive one or more rope belts, of one or more rope belts carried by said drums and overlapped by said conveyer-belt, and means for carrying the slack under run of the conveyer-belt and for adjusting one of said drums for tightening the rope belts, whereby to regulate the support of the upper run of the conveyer-belt.

ECKLEY B. COXE.

Witnesses:
HARRY J. DAVIS,
ELLIOTT A. OBERRENDER.